Dec. 13, 1938.  M. REINSTEIN  2,139,695
PEAR PEELING, CORING, AND SPLITTING MACHINE
Original Filed June 8, 1931   6 Sheets-Sheet 1

Fig. 1.

INVENTOR.
MAURICE REINSTEIN.
BY Munn & Co.
ATTORNEYS.

Dec. 13, 1938.    M. REINSTEIN    2,139,695
PEAR PEELING, CORING, AND SPLITTING MACHINE
Original Filed June 8, 1931    6 Sheets-Sheet 2

INVENTOR.
MAURICE REINSTEIN
BY Munn & Co.
ATTORNEYS.

Dec. 13, 1938.  M. REINSTEIN  2,139,695
PEAR PEELING, CORING, AND SPLITTING MACHINE
Original Filed June 8, 1931  6 Sheets-Sheet 6

INVENTOR.
MAURICE REINSTEIN
BY
Munn & Co
ATTORNEYS.

Patented Dec. 13, 1938

2,139,695

UNITED STATES PATENT OFFICE 2,139,695

PEAR PEELING, CORING, AND SPLITTING MACHINE

Maurice Reinstein, San Francisco, Calif.; John L. Jacobs executor of said Maurice Reinstein, deceased, assignor, by mesne assignments, to Food Machinery Corporation, San Jose, Calif., a corporation of Delaware Application June 8, 1931, Serial No. 542,922
Renewed October 26, 1934

25 Claims. (Cl. 146—33)

My invention relates to improvements in pear peeling, coring and splitting machines, and it consists of the combinations, constructions and arrangements hereinafter described and claimed.

An object of my invention is to provide a pear peeling, coring and splitting machine which is an improvement over a similar device filed March 31, 1931, Serial No. 526,740. In the co-pending device I showed a mechanism for simultaneously coring and peeling a pear. In the present form of the invention the coring operation takes place after the peeling operation, and while the pear is impinged upon the splitting knives. The splitting knives hold the pear against rotation during the coring operation more efficiently than the peeling knives.

A further object of my invention is to provide a device of the type described in which novel means is provided for boring a hole into the blossom end of the pear prior to the tubular member of the coring mechanism entering the hole. The pear has previously had its stem removed. The tubular member of the coring mechanism does not pass entirely through the pear as is true in my co-pending application. In the present form of the device the core portion of the pear extending from the stem end to the middle of the pear is not removed.

A further improvement of the present invention over the co-pending device lies in the provision of a preformed coring blade that normally lies within the tubular member and novel cam means for extending the blade radially for the coring of the pear. The cams that move the blade into operative position also aid in locking the blade in this position.

The machine makes use of a separate tripping mechanism for causing the machine to operate, and this permits the operator to center a pear while the machine is operating on a prior pear.

Other objects and advantages will appear in the following specification, and the novel features of the device will be particularly pointed out in the appended claims.

My invention is illustrated in the accompanying drawings forming a part of this application, in which.

In carrying out my invention it is best to describe each function of the machine as it takes place, from the placing of the pear in the pear feeding mechanism until the pear is finally ejected from the machine after being peeled, cored and split. The description of each feature and its operation will be given before taking up the succeeding feature.

*Pear centering mechanism*

Figure 1:
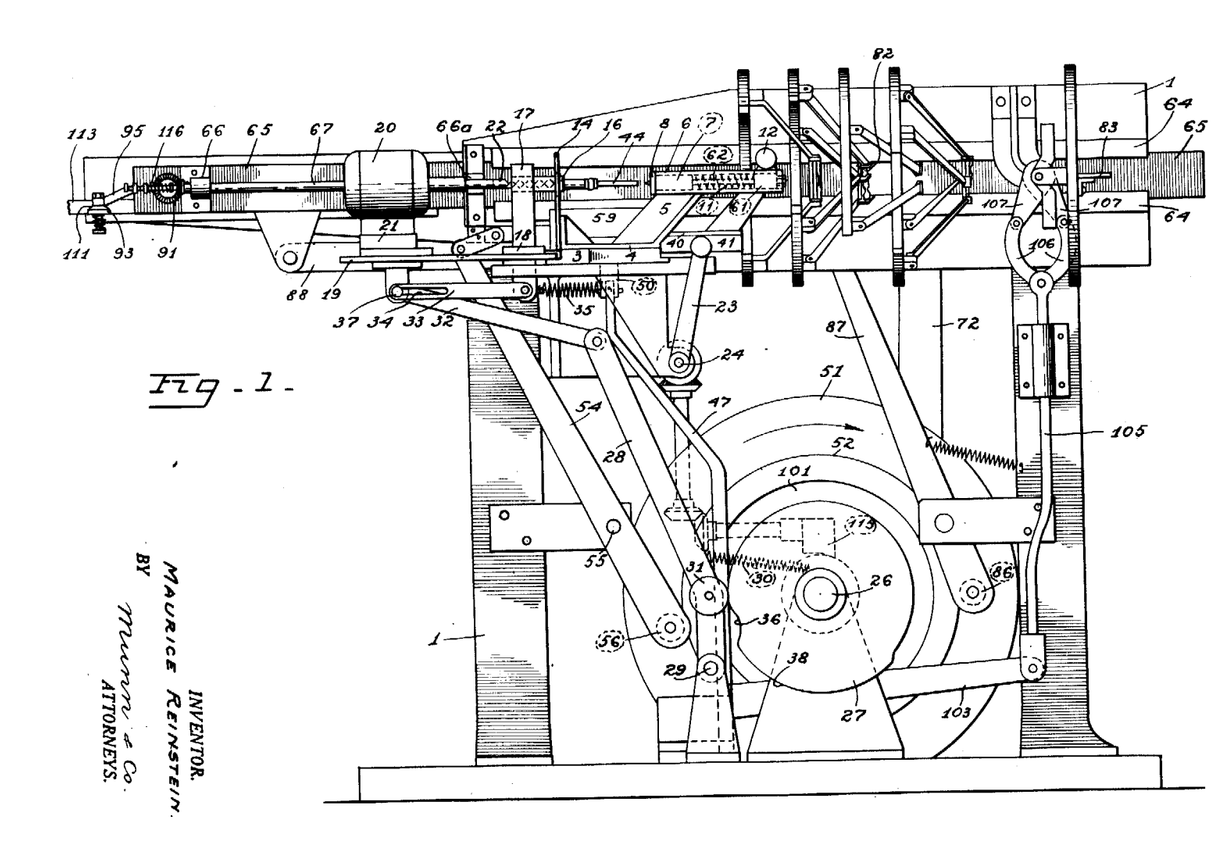
Figure 1 is a front elevation of the machine.
Figure 4:
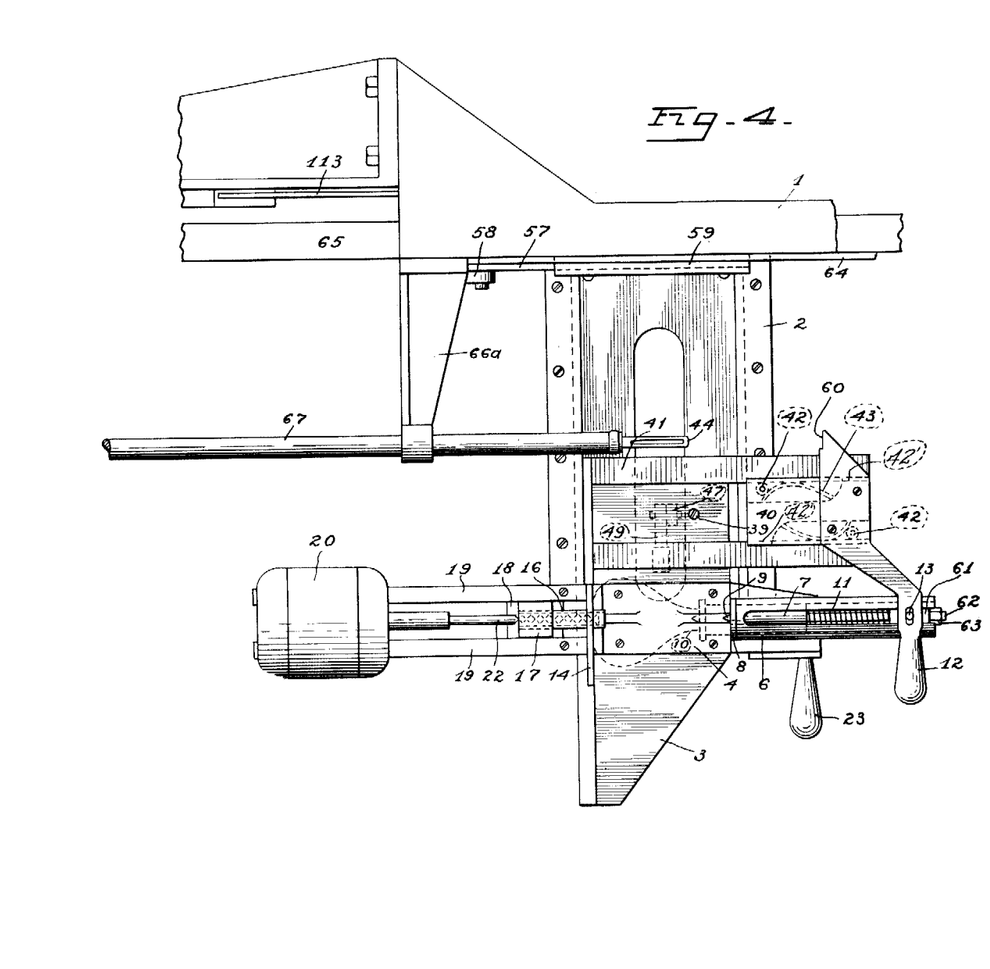
Figure 4 is a plan view of the pear feeding mechanism.
Figure 5:
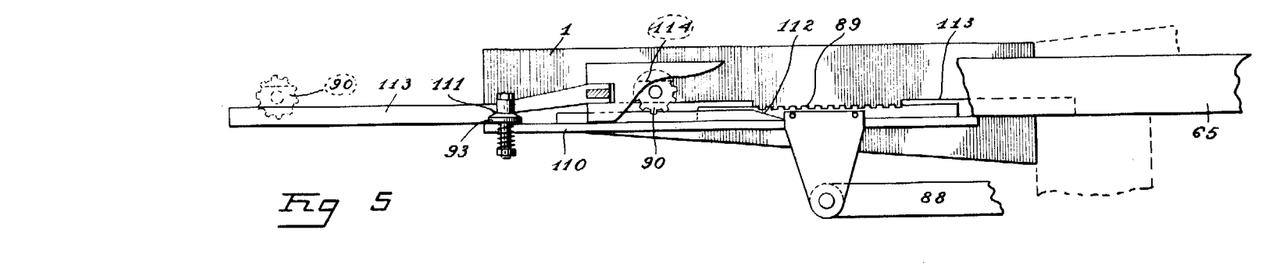
Figure 5 is a front view of a portion of the coring mechanism.

The machine comprises a frame indicated generally at 1 and Figures 1 and 4 show how the frame 1 supports a guide 2, and further show how a base 3 is slidable in the guide in a transverse direction to the length of the machine. The base 3 carries a casting 4 and an arm 5 of the casting (see Figure 1) supports a cylidnrical member 6 in which a spring pressed plunger 7 is mounted. The plunger 7 has a head 8 with a pointed end 9 designed to enter the stem end of a pear 10 (see Figure 4). A spring 11 tends to urge the plunger 7 into operative position. A handle 12 is connected to the plunger 7 by means of a pin 13, a sleeve 61, and the spring 11, and this handle may be manually moved to the left in Figure 4 for causing the head 8 to press against the pear 10 and to force the blossom end of the pear against a stop 14.

Figure 2:
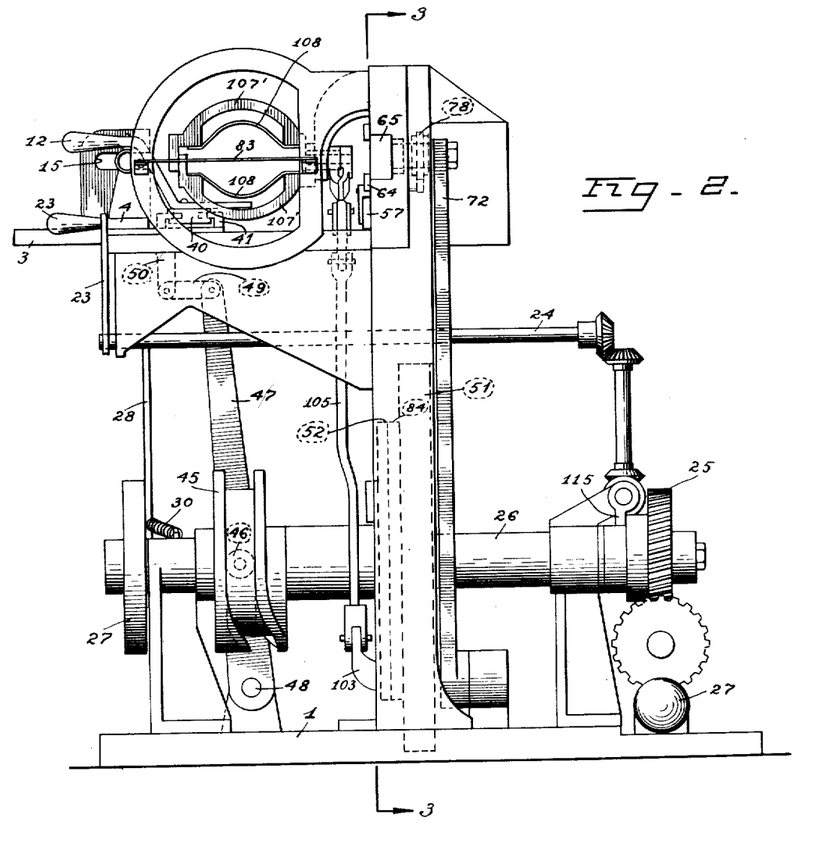
Figure 2 is a side elevation.

The stop 14 (see Figure 1) is carried by the base 3 and is provided with a slot 15 for receiving a tubular member 16 (see Figure 2). When the machine is idle the tubular member 16 projects a slight distance beyond the stop 14 as shown in Figure 1.

The tubular member 16 is carried by an upright 17, which in turn is mounted upon a base 18 that is slidably disposed in a guide 19 carried by the guide 2. The upright 17 has a limited movement to the left in Figure 1 for removing the tubular member 16 from the slot 15.

A motor 20 is mounted upon a base 21 that is also slidable in the guide 19 and this motor carries a drill 22 that is slidably disposed in the tubular member 16. In normal position the end of the drill 22 is disposed flush with the end of the tubular member 16.

It is best now to describe how the blossom end of the pear is provided with an opening that extends through the core. The operator after cutting the stem end of the fruit and placing the blossom end on the tubular member 16 and causing the spring pressed plunger to engage with the stem end, rocks a handle 23 (see Figure 1) and this movement rocks a shaft 24 which through a mechanism described in my copending application connects a worm gear 25 to a drive shaft 26. The worm gear 25 is rotated by a motor 27 and the connection between the worm gear 25 and the shaft 26 will remain for one complete revolution of the shaft, after which the shaft will be automatically disconnected from the worm gear (see Figure 2). The rotation of the shaft 26 will rotate a cam 27 (see Figure 1).

A lever 28 is pivoted at 29 to the frame 1 and has a spring 30 that swings the lever so that a cam roller 31 rides on the cam 27. A link 32 connects the lever 28 with the base 21. A second link 33 connects the base 21 with the base 18. It will be noted that the second link 33 has a slot 34 therein. A spring 35 urges the base 18 and link 33 to the right in Figure 1.

The cam 27 is rotated in a clockwise direction in Figure 1 and it has a depression 36 that permits the lever 28 to swing to the right and to move the motor 20 and drill 22 to the right. The drill is rotating at a high speed and the depth of the recess 36 determines the length of the bore in the fruit cut away by the drill 22. The drill forces the portions of fruit that are cut through the tubular member 16.

The movement of the motor 20 and the drill 22 to the right without moving the base 18 to the right is permitted because the pivot pin 37 would travel in the slot 34. After the roller 31 rides through the depression 36 it will ride upon a raised portion 38 of the cam 27 and this will move the bases 21 and 18 to the extreme left position from the position shown in Figure 1. The drill 22 and tubular member 16 will be moved free of the stop 14 and the pear will now be supported by the stop and by the spring pressed head 7.

It might be well to state at this time that the operator in moving the handle 12 to the left compresses the spring 11 and causes the head 8 to yieldingly engage with the end of the pear 10. A stop 39 carried by the base 3 (see Figure 4) limits the movement of a slide 40 to the left in Figure 4. The slide 40 carries the handle 12 and moves in a guide 41 carried by the base 3. The operator in moving the handle 12 brings the roller 42 of the slide against the guide 41 and the slide moves easily because the handle 12 tends to rock the slide in a clockwise direction when moving the slide. Yielding means 43 in the shape of springs bear against the sides of the guide 41 and tend to rock the slide 40 in a counter-clockwise direction for moving the rollers 42 away from and the ends 42' into binding engagement with the guide. The spring 11 pressing against the handle 12 only accentuates this movement and therefore the slide 40 is held against return movement. The spring 11 will therefore remain compressed and will exert a continuous force against the head 8. The force is sufficient to support the fruit between the head 8 and the stop 14.

After the fruit has been centered and bored the base 3 is moved in the guide 2 so as to center the bore in the fruit with the axis of a coring member. As already stated, the bore in the fruit passes only through the core. The diameter of the coring member 44 is slightly larger than the bore in the fruit and therefore the entrance of the coring member into the fruit will cause a snug engagement which will support the fruit.

The means for moving the base 3 in the guide 2 comprises a cam 45 (see Figure 2) that is mounted on the shaft 26 and that has a groove 6 for receiving a roller 46 carried by a lever 47 that is pivoted at 48 to the frame 1. The top of the lever 47 is connected by a link 49 to a projection 50 depending from the base 3. The groove in the cam 45 is so arranged that it will swing the lever 47 in a clockwise direction in Figure 2 after the drill and tubular member 16 have been removed from the stop 14. The moving of the base 3 moves the pear 10 transversely and aligns it with the coring member 44. The cam 45 is so arranged that it will hold the base 3 in its moved position while the coring member 44 is entering the bore in the fruit.

Figure 3:
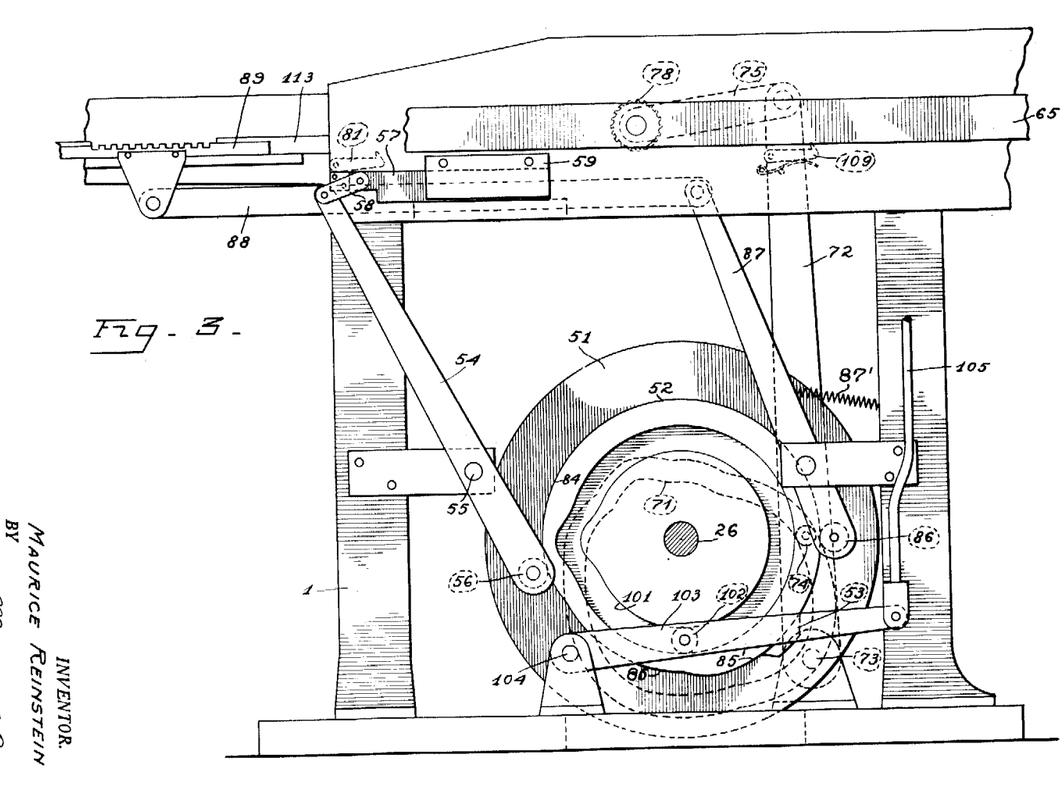
Figure 3 is a section along the line 3—3 of Figure 2.

After the coring member 44 has entered the fruit the head 8 is freed from the fruit by the following mechanism: A large wheel 51 (see Figure 3) is carried by the shaft 26 and has a cam edge 52 that has a projection 53. A lever 54 is pivoted at 55 to the frame 1 and a roller 56 carried by the lever bears against the edge 52. The projection 53 striking the roller 56 will swing the lever 54 in a clockwise direction and the lever will move an ejector 57 by means of a link 58. The ejector slides in a guide 59 (see Figure 4) and strikes a notch 60 in the handle 12 and moves the handle and slide 40 to the right and this returns the head 8 to the full line position shown in Figure 4. The slide 40 is rocked for bringing the rollers 42 into position during this movement. It will be seen that the pin 13 is connected to the sleeve 61 which rides on a rod 62 of the plunger 7. The sleeve 61 engages with a nut 63 on the rod 62 and moves the head 8 so as to free the pear 10. The pear will now be supported entirely by the coring member 44.

As soon as the head 8 is moved free of the pear 10 the base 3 is moved back into starting position while the coring member remains stationary. I will presently describe the mechanism for moving the coring member. The return movement of the base 3 is caused by the cam 45 and lever 47. The return of the base 3 positions the head 8 in alignment with the tubular member 16 and the operator can place another pear in position while the pear on the coring member 44 is being acted upon.

*Pear coring mechanism*

Figure 6:
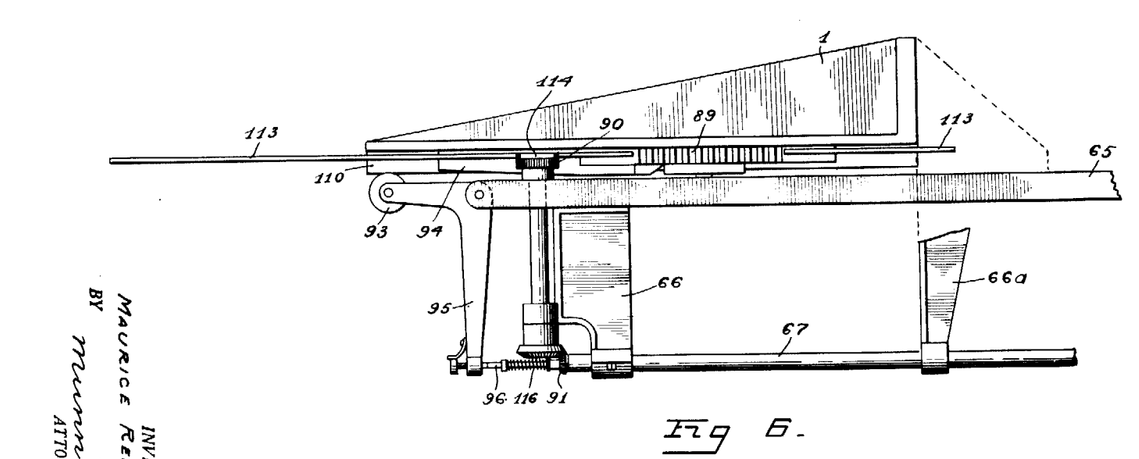
Figure 6 is a plan view of Figure 5.

The frame 1 has a guide 64 which receives a main slide 65 (see Figure 1). Figure 6 shows the main slide 65 as carrying brackets 66 and 66a which in turn carry a sleeve 67. The sleeve 67 is clamped in bracket 66 and slides in the bracket 66a and houses the coring member 44. The member 44 (see Figure 7) extends beyond the sleeve 67 at both ends and has a slot 68 for permitting a pre-formed coring knife 69 to project therethrough. The knife normally assumes the position shiwn in Figure 7 and is in this position when the member 44 enters the bore in the fruit. The sleeve 67 carries a rubber bumper 70 that bears against the blossom end of the fruit.

After the base 3 has positioned the fruit 10 so that the bore in the fruit registers with the axis of the coring member 44, the member 44 is moved to the right in Figure 4 so that it will enter the bore. This movement is accomplished by the following mechanism: The wheel 51 has a cam groove 71 in its rear face (note the dotted lines in Figure 3). A lever 72 is pivoted at 73 to the frame 1 and has a roller 74 riding in the cam groove 71. The lever 72 is connected to the main slide 65 by the link 75. The cam groove 71 is of such shape as to move the coring member 44 into the fruit after the fruit has been positioned and then to stop further movement while the base 3 is returning to starting position. The coring member 44 is carried by the sleeve 67 and this sleeve is moved by the bracket 66, which in turn are moved by the main slide 65.

Figures 8, 9, 10:
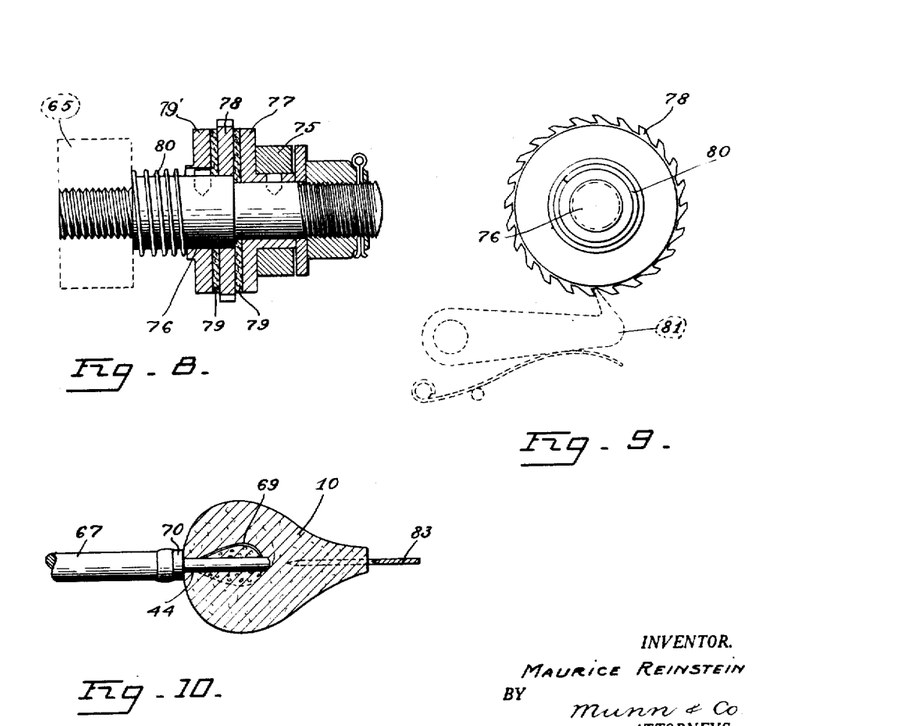
Figure 8 is a sectional view of a braking mechanism.
Figure 9 is a side elevation of Figure 8.
Figure 10 shows the positioning of the pear during the coring operation.

The main slide is brought to a temporary stop after the coring member 44 has entered the fruit and a braking action is applied to the main slide when bringing it to a stop. The particular construction of the brake is shown in Figure 8. The main slide 65 carries a shank 76 threaded in the manner shown, and a collar 77 is mounted on the shank and receives one end of the link 75. A ratchet 78 (see Figures 8 and 9) is rotatably mounted on the shank 76 and friction shoes 79 bear against the ratchet and tend to prevent its turning. The shoes are prevented from turning by being applied to metal body members 77 and 79' which are keyed to the shank 76. A spring 80 urges one braking shoe 79 against the ratchet and in turn this moves the ratchet against the other braking shoe. A spring pressed trigger or pawl 81 is placed on the main frame 1 (see Figure 3) and this engages with the pawl at the moment the cam groove 71 is bringing the lever 72 to a stop. The pawl 81 tends to rotate the ratchet against a braking action.

The cam groove 71 moves the main slide 65 forwardly after the base 3 has been returned to starting position and causes the coring member 44 to move the fruit through a plurality of pairs of peeling knives 82. These knives are shown in Figure 1 and they have been described in my copending application and therefore need no description at this time, except to say that they are so arranged as to peel the entire pear while the pear passes therethrough.

Figure 11:
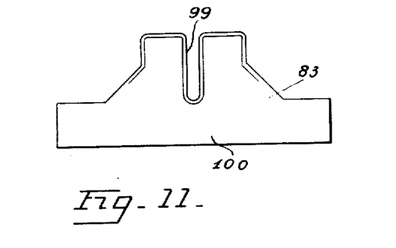
Figure 11 shows a plan view of the pear splitting knife.

After the pear has been advanced through all of the peeling knives 82 the member 44 is brought to rest while the forward end of the pear impinges upon a splitting knife 83 of the shape shown in Figures 10 and 11. The member 44 although not advanced temporarily is now rotated and the coring knife 69 is moved into the dotted line position shown in Figure 7 and into the full line position shown in Figure 10.

This is accomplished by the mechanism now to be described. While the main slide 65 has been moving forwardly the depressed portion 85 of a cam 84 positioned adjacent to the cam 52 (see Figure 3) passes beneath a roller 86 on a lever 87 so that the lever is swung by a spring 87' in a clockwise direction. A link 88 connects the lever 87 with a rack 89. Figure 6 shows the main slide 65 as having a pinion 90 that is moved with the main slide and comes into mesh with the rack 89 after the coring member 44 comes to rest with the pear 10 partly impinged on the splitting knife 83. At this time the enlarged portion 85' of the cam 84 passes under the roller 86 and rotates the lever 87 in a counterclockwise direction as viewed in Fig. 3. The rack 89 is thus shifted to the left and the resulting rotation of the pinion 90 on the rack 89 will rotate the coring member 44 through the medium of the bevelled gears 91 shown in Figure 6 and the screw 92 connecting the sleeve on one of the gears 91 with the coring member 44 (see Figure 7).

Figure 7:
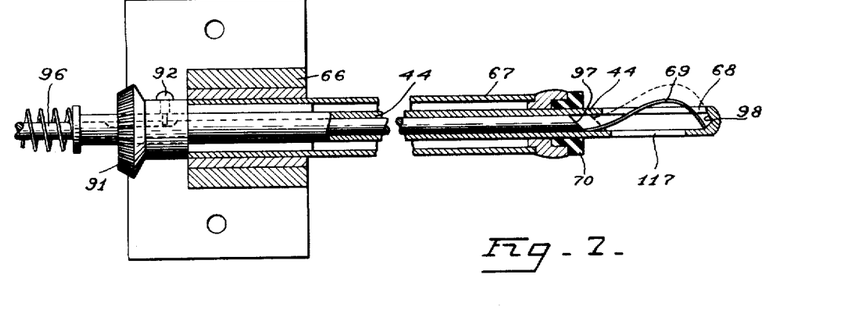
Figure 7 is a sectional view of another part of the coring mechanism.

During this rotative movement of the coring member 44 the coring knife 69 is moved into the dotted line position shown in Figure 7. This movement has also been described in my copending application and comprises a roller 93 that contacts with a cam 94 (see Figure 6) that is carried by the rack 89 and is movable therewith. The roller 93 rocks a bell crank lever 95 and this moves a rod 96 with respect to the member 44 (see Figure 7) and the cam end 97 of the rod moves the coring knife into operative position. The end of the member 44 is closed and has a cam portion 98 cooperating with the cam end 97. The cam 97 also cooperates with the member 44 and clamps the knife in operative position.

It will be seen therefore, that the coring knife 69 will make a spiral cut in the core because the knife is moved into operative position while the member 44 is being rotated. The rack 89 is moved with respect to the pinion 90 during the coring operation in order that the member 44 may be held against longitudinal movement while at the same time being rotated.

While the pear is held against longitudinal movement the blossom end is cut off and this is accomplished by the same mechanism shown in my co-pending application. Briefly this mechanism comprises a cam groove 101 in the wheel 51 (see Figure 3), a roller 102 movable in the cam groove 101, a lever 103 carrying the roller and pivoted to the frame 1 at 104, a link 105 (see Figure 1) connected to the lever 103, links 106 connected to the link 105, arms 107, knife carrying frames 107' connected to the links 106 and blossom end cutting knives 108 secured to the frames 107' (see Figure 2). The arms 107 are actuated and the knives 108 cut the blossom end of the pear while the member 44 is held against longitudinal movement. It should be noted that a pawl 109 similar to the pawl 81 engages with the ratchet 78 and this creates a braking force for bringing the member 44 to a stop.

*Pear splitting operation*

After the coring operation has taken place the cam groove 71 again advances the main slide 65 so that the member 44 will move the pear over the splitting knife 83. Figure 11 shows the knife 83 provided with a central recess 99 for receiving the member 44, and the knife is closed at 100 so as to cut that portion of the fruit extending from the stem end down to the coring member 44. The splitting knife 83 will therefore cut the pear into two equal halves and these halves may be discharged into receptacles not shown.

The member 44 now starts on its return movement and during this movement the pinion 90 again engages with the rack 89 so as to rotate the member 44. The rack 89 rides on a ledge 110 of the main frame 1. The roller 93 has a portion 111 that rides on a cam edge 112 and this prevents the cam edge 94 acting on the bell crank lever 95 and therefore the coring knife 69 will not be moved into operative position. The cam 94 is carried by the rack 89 and moves therewith. Guides 113 also move with the rack 89 and the gear 90 has flat portions 114 for engaging with the guides 113 so as to prevent further rotation of the gear after the gear once passes beyond the rack 89.

When the main slide 65 reaches the position shown in Figure 1 the shaft 26 will be automatically disengaged from the worm gear 25 by the cam 115 in the manner set forth in my copending application. The machine is now ready for the next pear which the operator has already placed on the tubular member 16 and has held in position by the head 8 and the pointed end 9. An actuation of the control handle 23 will again start the functioning of the device and the new pear will be operated upon in the same manner as that described for the first pear. It should be noted from Figure 6 that a spring 116 returns the rod 96 to normal position and this permits the coring knife 69 to move back into the member 44. The member 44 has a slot 117 for allowing coring matter to pass therethrough so as to prevent the knife from becoming clogged.

Although I have shown and described one embodiment of my invention it is to be understood that the same is susceptible of various changes and I reserve the right to employ such changes as may come within the scope of the claims hereto annexed.

I claim:

1. A coring mechanism comprising a tubular member designed to enter a pear, said member having a slot therein, a pre-formed arcuate cutting blade disposed in the tube, caming means disposed at the ends of the blade, and means for moving the caming means toward each other for moving the pre-formed curved portion of the blade through the slot, and means for rotating the member.

2. A coring mechanism comprising a tubular member designed to enter a pear, said member having a slot therein, a pre-formed arcuate cutting blade disposed in the tube, cams disposed at the ends of the blade, and means for moving the cams toward each other for moving the pre-formed curved portion of the blade through the slot, and means for rotating the member, one of said cams clamping one end of the blade to the tubular member when the cams are moved toward each other, whereby the blade is held in extended position.

3. A centering device and fruit corer comprising means for engaging with the stem end of a pear, a tubular member for entering the blossom end, means for cutting a bore in the blossom end and removing the material through the tubular member, means for withdrawing the tubular member from the pear, a coring mechanism having a tubular member slightly larger in diameter than the first tubular member, means for aligning the bore of the fruit with the second tubular member, means for advancing the second tubular member into the bore, said second tubular member having a slot, a curved knife disposed in the tube and projectible through the slot, cams for moving the knife through the slot and for clamping its ends to the tube, and means for rotating the second tube for coring the fruit.

4. In a pear corer, peeler, and splitter, a pear supporting and moving member for moving a pair in the direction of its length through the peeler and the splitter, said member carrying a coring mechanism, means for advancing the member, said means bringing the member to a temporary stop in its longitudinal movement when the pear contacts with the splitter, means for applying a brake to the longitudinal movement of the member for aiding in bringing it to an abrupt stop, means for actuating the coring mechanism and for rotating the member while the member is held against longitudinal movement, said member advancing means again moving the member after the coring for causing the splitter to cut the pear.

5. In combination, a tubular fruit supporting member having a slot therein, a coring knife mounted in said tube and having a pre-formed curved portion projectible through the slot, and cam means engageable with the ends of the knife and being movable toward each other for extending the knife through the slot while rotating the tube for coring the fruit.

6. In a pear centering device, a stop having a slot therein, a tubular member projecting through the slot, a rotatable drill mounted in the tubular member, spring means for yieldingly holding the blossom end of a pear against the stop and in a position where the tubular member enters the pear, and means for advancing the drill approximately half way into the pear for forming a bore extending through the core and then for removing the drill from the pear.

7. In a pear centering device, a stop having a slot therein, a tubular member projecting through the slot, a rotatable drill mounted in the tubular member, spring means for yieldingly holding the blossom end of a pear against the stop and in a position where the tubular member enters the pear, means for advancing the drill approximately half way into the pear for forming a bore extending through the core and then for removing the drill from the pear and also the tubular member, a coring member for entering the bore in the pear, and means for moving the pear into a position for aligning the bore with the coring member.

8. In a pear centering device, a plunger for engaging with the stem end of a pear, a spring, a handle for compressing the spring for yieldingly holding the plunger against the pear, a slide for supporting the handle, a guide for the slide, spring means carried by the slide for swinging it into binding engagement with the guide for preventing the spring from returning the handle to starting position, rollers carried by the slide, and means for engaging with the slide for bringing the rollers against the guide and freeing the slide from a binding position for returning the slide to starting position.

9. In a pear centering mechanism, a stop having a slot therein, a tubular member projecting through the slot and designed to enter the blossom end of a pear, a spring pressed plunger engaging with the stem end, a drill disposed in the tubular member, means for advancing the drill into and out of the pear for forming a bore extending approximately half way through the pear, said means when moving the drill out of the pear, carrying the tubular member therewith, a coring member having a diameter slightly larger in diameter than the bore in the pear, means for moving the stop and plunger into a position to align the bore with the coring member, and means for advancing the coring member into the bore.

10. In a pear centering mechanism, a stop having a slot therein, a tubular member projecting through the slot and designed to enter the blossom end of a pear, a spring pressed plunger engaging with the stem end, a drill disposed in the tubular member, means for advancing the drill into and out of the pear for forming a bore extending approximately half way through the pear, said means when moving the drill out of the pear, carrying the tubular member therewith, a coring member having a diameter slightly larger in diameter than the bore in the pear, means for moving the stop and plunger into a position to align the bore with the coring member, and means for advancing the coring member into the bore, means for freeing the plunger from the pear, said stop and plunger moving means again returning them to starting position.

11. In a pear coring, peeling and splitting machine, a pear supporting member movable in a predetermined path, peeling means and splitting means placed in the path, coring means carried by the member, pear centering means normally disposed out of the path of said member for receiving a pear, means for moving the pear centering means from receiving position and for centering the pear with respect to said member, means for moving the member for causing it to enter and to support the pear and for holding the member against further longitudinal movement until the centering means has been moved away, said member-moving means moving the pear into engagement with the splitting knife, means for causing the coring means to become active while the pear remains on the splitting knife, said member moving means moving the pear by the splitting knife after the coring operation.

12. A pear coring, peeling and splitting machine comprising a pear supporting member having a coring mechanism, pear peeling and splitting means placed in the path of the member, a pear receiving and centering mechanism, means controlled by the operator for causing the pear centering means to transfer the pear from receiving position to said member, means for causing the member to first enter the pear and then to move the pear in the direction of its length past the peeling and splitting means, and means for actuating the coring mechanism when the pear is engaged by the splitting means.

13. In a fruit splitting and coring machine, a splitting knife, a coring knife, an impaling member for supporting a pear by impalement of the pear thereon, means providing relative movement between a pear so supported and said splitting knife to partially impale the pear on said splitting knife and hold the pear in such position for the coring operation, and means for actuating the coring knife while the pear is only partially impaled on said splitting knife.

14. In a fruit splitting and coring machine, a splitting knife, a tube for supporting and moving a pear onto the splitting knife, a coring knife housed in said tube, and means for operating said tube to impale a pear part way on said splitting knife and to maintain the pear in such partially impaled position during operation of said coring knife, and then to complete the splitting operation.

15. In a fruit splitting and coring machine, a splitting knife, a tube for supporting and moving a pear onto the splitting knife, an abutment on said tube for engaging the butt end of a pear supported thereon, a coring knife housed in said tube adjacent said abutment for alignment with the core of a pear on said tube, and means for operating said tube to impale a pear part way on said splitting knife and to maintain the pear in this position during operation of said coring knife, and then to complete the splitting operation.

16. In a fruit splitting and coring machine, a splitting knife, a tube for supporting and moving a pear onto said splitting knife, means mounting said tube for both rotary and axial movement, a coring knife housed in said tube, and operating and control means for said tube for effecting axial movement of said tube to impale a pear part way on said splitting knife preparatory to a coring operation, to rotate said tube and actuate said coring knife, and for subsequently effecting further axial movement of said tube to complete the splitting operation.

17. In a fruit splitting and coring machine, fruit impaling means, a tube for supporting and moving a pear onto said impaling means, means mounting said tube for both rotary and axial movement, a coring knife housed in said tube, and operating and control means for said tube for effecting axial movement of said tube to impale a pear part way on said impaling means preparatory to a coring operation, and then to rotate said tube and actuate said coring knife.

18. In a fruit splitting and coring machine, a splitting knife, a fruit supporting tube, means mounting said tube and said knife for relative rotary and axial movement with respect to the axis of said tube, a coring knife housed in said tube, means for effecting relative axial movement between said tube and said splitting knife to impale a pear supported by said tube part way on said knife, means for enabling said coring knife, and means for effecting relative rotary movement between said tube and said splitting knife with a pear partially impaled on said splitting knife to perform the coring operation.

19. In a fruit splitting and coring machine, fruit impaling means, a fruit supporting tube, means mounting said tube and said impaling means for relative rotary and axial movement with respect to the axis of said tube, a coring knife housed in said tube, means for effecting relative axial movement between said tube and said impaling means to impale a pear supported by said tube part way on said impaling means, means for enabling said coring knife, and means for effecting relative rotary movement between said tube and said impaling means with a pear partially impaled on said impaling means to perform the coring operation.

20. In a fruit coring and peeling machine, a fruit feeding device designed to receive fruit, a fruit supporting tube, said fruit feeding device having means for initially supporting the fruit with the fruit axis paralleling the tube axis, means for moving the feeding device to position the fruit in axial alignment with the tube, means for moving the tube into one end of the fruit, and for freeing the feeding means from the fruit, means including a coring knife housed in said tube for coring the fruit, and blade means partially impaling the fruit at the other end to hold it against rotation during the coring operation.

21. In a fruit coring and peeling machine, a fruit feeding device designed to receive fruit, a fruit peeling means including a fruit supporting tube, said fruit feeding device having means for initially supporting the fruit with the fruit axis paralleling the tube axis, means for moving the feeding device to position the fruit in axial alignment with the tube, means for moving the tube into the fruit, and for freeing the feeding means from the fruit, means for actuating said fruit peeling means for peeling the fruit while supported by the tube, and means including a coring knife housed in said tube for coring the fruit after the peeling operation, and a splitting knife designed to enter the fruit and to hold it against rotation during the coring operation.

22. In combination, a tubular fruit supporting member having a longitudinal slot therein, a coring strip housed in said member and guided by said slot to be projected therethrough in arcuate coring position, a V-shaped surface in said tube in alignment with said slot for engaging one end of said strip, and a rod slidable in said tube and having a beveled end for engaging the other end of said strip.

23. In a fruit splitting and coring machine, a splitting knife, in impaling member for supporting a pear by impalement of the pear thereon, a coring knife carried by said impaling member, and means providing relative movement between a pear so supported and said splitting knife to impale the pear part way on said splitting knife and to maintain the pear in such partially impaled position during operation of said coring knife, and then to complete the splitting operation.

24. In a fruit splitting and coring machine, a splitting knife, a tube for supporting a pear, an abutment on said tube for engaging the butt end of a pear supported thereon, a coring knife housed in said tube adjacent said abutment for alignment with the core of a pear on said tube, and means providing relative movement between said tube and splitting knife to impale the pear part way on said splitting knife and to maintain the pear in this position during operation of said coring knife, and then to complete the splitting operation.

25. In a fruit splitting and coring machine, a splitting knife, an impaling member for supporting a pear by impalement of the pear thereon, means mountnig said impaling member and said knife for relative rotary movement with respect to the axis of said impaling member, a coring knife carried by said impaling member, means for effecting relative movement between said pear and said splitting knife to impale the pear supported by said impaling member part way on said knife, and means for effecting relative rotary movement between said impaling member and said splitting knife with the pear partially impaled on said splitting knife to perform the coring operation.

MAURICE REINSTEIN.

---

CERTIFICATE OF CORRECTION.

Patent No. 2,139,695.                                            December 13, 1938.

MAURICE REINSTEIN.

It is hereby certified that error appears in the printed specification of the above numbered patent requiring correction as follows: Page 2, second column, line 64, for "shiwn" read shown; page 4, first column, line 60, claim 4, for "pair" read pear; page 6, first column, line 4, claim 23, for "in" read an; and second column, line 8, claim 25, for "mountnig" read mounting; and that the said Letters Patent should be read with this correction therein that the same may conform to the record of the case in the Patent Office.

Signed and sealed this 6th day of June, A.D. 1939.

Henry Van Arsdale (Seal)                          Acting Commissioner of Patents.

and having a beveled end for engaging the other end of said strip.

23. In a fruit splitting and coring machine, a splitting knife, in impaling member for supporting a pear by impalement of the pear thereon, a coring knife carried by said impaling member, and means providing relative movement between a pear so supported and said splitting knife to impale the pear part way on said splitting knife and to maintain the pear in such partially impaled position during operation of said coring knife, and then to complete the splitting operation.

24. In a fruit splitting and coring machine, a splitting knife, a tube for supporting a pear, an abutment on said tube for engaging the butt end of a pear supported thereon, a coring knife housed in said tube adjacent said abutment for alignment with the core of a pear on said tube, and means providing relative movement between said tube and splitting knife to impale the pear part way on said splitting knife and to maintain the pear in this position during operation of said coring knife, and then to complete the splitting operation.

25. In a fruit splitting and coring machine, a splitting knife, an impaling member for supporting a pear by impalement of the pear thereon, means mountnig said impaling member and said knife for relative rotary movement with respect to the axis of said impaling member, a coring knife carried by said impaling member, means for effecting relative movement between said pear and said splitting knife to impale the pear supported by said impaling member part way on said knife, and means for effecting relative rotary movement between said impaling member and said splitting knife with the pear partially impaled on said splitting knife to perform the coring operation.

MAURICE REINSTEIN.

CERTIFICATE OF CORRECTION.

Patent No. 2,139,695.   December 13, 1938.

MAURICE REINSTEIN.

It is hereby certified that error appears in the printed specification of the above numbered patent requiring correction as follows: Page 2, second column, line 64, for "shiwn" read shown; page 4, first column, line 60, claim 4, for "pair" read pear; page 6, first column, line 4, claim 23, for "in" read an; and second column, line 8, claim 25, for "mountnig" read mounting; and that the said Letters Patent should be read with this correction therein that the same may conform to the record of the case in the Patent Office.

Signed and sealed this 6th day of June, A.D. 1939.

Henry Van Arsdale (Seal)   Acting Commissioner of Patents.